US011832024B2

(12) United States Patent
Hays et al.

(10) Patent No.: US 11,832,024 B2
(45) Date of Patent: Nov. 28, 2023

(54) METHOD AND APPARATUS FOR DELIVERING VIDEO AND VIDEO-RELATED CONTENT AT SUB-ASSET LEVEL

(75) Inventors: Morgan R. Hays, Swarthmore, PA (US); Randall Hounsell, Philadelphia, PA (US); Jeanine Heck, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1180 days.

(21) Appl. No.: 12/274,452

(22) Filed: Nov. 20, 2008

(65) Prior Publication Data

US 2010/0125875 A1    May 20, 2010

(51) Int. Cl.
*H04N 7/173*    (2011.01)
*H04N 21/845*    (2011.01)
*H04N 21/482*    (2011.01)
*H04N 21/442*    (2011.01)

(52) U.S. Cl.
CPC ... *H04N 7/17318* (2013.01); *H04N 21/44204* (2013.01); *H04N 21/4826* (2013.01); *H04N 21/4828* (2013.01); *H04N 21/8456* (2013.01)

(58) Field of Classification Search
CPC ............ H04N 21/812; H04N 21/4532; H04N 21/482; H04N 21/4316; H04N 21/44008; H04N 21/44222; H04N 21/4722; H04N 5/44591; H04N 21/8133; H04N 2005/44547; H04N 2005/44556; H04N 2005/44565; H04N 21/4821; H04N 5/44543; H04N 21/44204; H04N 21/47; H04N 21/4755; H04N 7/17318; H04N 21/4826; H04N 21/4828; H04N 21/8456

USPC .............................................. 725/45, 46, 47
See application file for complete search history.

(56) References Cited

U.S. PATENT DOCUMENTS

| 5,287,489 | A | 2/1994 | Nimmo et al. |
| 5,321,750 | A | 6/1994 | Nadan |
| 5,353,121 | A | 10/1994 | Young et al. |
| 5,485,221 | A | 1/1996 | Banker et al. |
| 5,521,841 | A | 5/1996 | Arman et al. |
| 5,530,939 | A | 6/1996 | Mansfield, Jr. et al. |
| 5,583,563 | A | 12/1996 | Wanderscheid et al. |
| 5,589,892 | A | 12/1996 | Knee et al. |

(Continued)

FOREIGN PATENT DOCUMENTS

| CA | 2685833 | 11/2009 |
| CA | 2832800 | 11/2013 |

(Continued)

OTHER PUBLICATIONS

Li, Y. et al., "Reliable Video Clock Time Recognition," Pattern Recognition, 2006, 1CPR 1006, 18th International Conference on Pattern Recognition, 4 pages.

(Continued)

*Primary Examiner* — Ngoc K Vu
(74) *Attorney, Agent, or Firm* — Banner & Witcoff, Ltd.

(57) ABSTRACT

A method and apparatus for delivering an ordered list of items of supplemental content to a consumer comprising determining a context of a portion of media selected for consumption, determining consumer preference information corresponding to the consumer, generating the ordered list of items of supplemental content as a function of the context and of the consumer preference information.

41 Claims, 3 Drawing Sheets

(56) References Cited

U.S. PATENT DOCUMENTS

| | | |
|---|---|---|
| 5,592,551 A | 1/1997 | Lett et al. |
| 5,594,509 A | 1/1997 | Florin et al. |
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette et al. |
| 5,737,552 A * | 4/1998 | Lavallee et al. ............... 715/720 |
| 5,802,284 A | 9/1998 | Karlton et al. |
| 5,826,102 A | 10/1998 | Escobar et al. |
| 5,844,620 A | 12/1998 | Coleman et al. |
| 5,850,218 A | 12/1998 | LaJoie et al. |
| 5,852,435 A | 12/1998 | Vigneaux et al. |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt et al. |
| 5,905,492 A | 5/1999 | Straub et al. |
| 5,929,849 A | 7/1999 | Kikinis |
| 5,945,987 A | 8/1999 | Dunn |
| 5,960,194 A | 9/1999 | Choy et al. |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,803 A | 12/1999 | Rowe et al. |
| 6,008,836 A | 12/1999 | Bruck et al. |
| 6,016,144 A | 1/2000 | Blonstein et al. |
| 6,025,837 A | 2/2000 | Matthews, III et al. |
| 6,038,560 A | 3/2000 | Wical |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons et al. |
| 6,477,705 B1 | 11/2002 | Yuen et al. |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,530,082 B1 | 3/2003 | Del Sesto et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,694,312 B2 | 2/2004 | Kobayashi et al. |
| 6,698,020 B1 | 2/2004 | Zigmond et al. |
| 6,704,359 B1 | 3/2004 | Bayrakeri et al. |
| 6,731,310 B2 | 5/2004 | Craycroft et al. |
| 6,745,367 B1 | 6/2004 | Bates et al. |
| 6,760,043 B2 | 7/2004 | Markel |
| 6,763,522 B1 | 7/2004 | Kondo et al. |
| 6,766,526 B1 | 7/2004 | Ellis |
| 6,806,887 B2 | 10/2004 | Chernock et al. |
| 6,857,128 B1 | 2/2005 | Borden, IV et al. |
| 6,886,029 B1 | 4/2005 | Pecus et al. |
| 6,904,610 B1 | 6/2005 | Bayrakeri et al. |
| 6,910,191 B2 | 6/2005 | Segerberg et al. |
| 6,918,131 B1 | 7/2005 | Rautila et al. |
| 6,963,880 B1 | 11/2005 | Pingte et al. |
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris et al. |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,177,861 B2 | 2/2007 | Tovinkere et al. |
| 7,197,715 B1 | 3/2007 | Valeria |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 * | 11/2007 | Krieger ............. H04N 5/44543 |
| | | 348/E5.105 |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,472,137 B2 | 12/2008 | Edelstein et al. |
| 7,490,092 B2 | 2/2009 | Sibley et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1 | 2/2013 | Khosla |
| 8,434,109 B2 * | 4/2013 | Kamimaeda ..... H04N 21/25891 |
| | | 725/46 |
| 8,448,208 B2 | 5/2013 | Moreau et al. |
| 8,660,545 B1 | 2/2014 | Redford et al. |
| 8,699,862 B1 | 4/2014 | Sharifi et al. |
| 8,793,256 B2 * | 7/2014 | McIntire ....................... 707/741 |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |

(56) References Cited

U.S. PATENT DOCUMENTS

| | | |
|---|---|---|
| 9,363,560 B2 | 6/2016 | Moreau et al. |
| 9,473,548 B1 | 10/2016 | Chakrovorthy et al. |
| 9,516,253 B2 | 12/2016 | De Andrade et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0104083 A1* | 8/2002 | Hendricks .......... H04N 21/2381 725/34 |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0144268 A1* | 10/2002 | Khoo et al. .................... 725/47 |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1 | 10/2002 | Mitchell |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0023975 A1 | 1/2003 | Schrader et al. |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093760 A1 | 5/2003 | Suzuki et al. |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0177501 A1 | 9/2003 | Takahashi et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1* | 1/2004 | Boston .................. G06Q 30/02 725/55 |
| 2004/0019900 A1 | 1/2004 | Knightbridge et al. |
| 2004/0019908 A1 | 1/2004 | Williams et al. |
| 2004/0022271 A1 | 2/2004 | Fichet et al. |
| 2004/0024753 A1 | 2/2004 | Chane et al. |
| 2004/0031015 A1 | 2/2004 | Ben-Romdhane et al. |
| 2004/0031058 A1 | 2/2004 | Reisman |
| 2004/0031062 A1 | 2/2004 | Emmons |
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0225751 A1 | 11/2004 | Urali |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1* | 7/2005 | Baumgartner .................. 725/46 |
| 2005/0166230 A1 | 7/2005 | Gaydou et al. |
| 2005/0204385 A1* | 9/2005 | Sull ........................ G06F 16/78 725/45 |
| 2005/0259147 A1 | 11/2005 | Nam et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0104511 A1 | 5/2006 | Guo et al. |

(56) References Cited

U.S. PATENT DOCUMENTS

| | | |
|---|---|---|
| 2006/0105793 A1 | 5/2006 | Gutowski et al. |
| 2006/0125962 A1 | 6/2006 | Shelton et al. |
| 2006/0143191 A1 | 6/2006 | Cho et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0050343 A1 | 3/2007 | Siddarampappa et al. |
| 2007/0064715 A1 | 3/2007 | Lloyd et al. |
| 2007/0083538 A1 | 4/2007 | Roy et al. |
| 2007/0112761 A1 | 5/2007 | Xu et al. |
| 2007/0157247 A1* | 7/2007 | Cordray ............... G06F 3/0481 725/47 |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1* | 10/2007 | McIntire et al. .............. 725/146 |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0092201 A1* | 4/2008 | Agarwal et al. .............. 725/135 |
| 2008/0113504 A1 | 5/2008 | Lee et al. |
| 2008/0126109 A1* | 5/2008 | Cragun et al. .................... 705/1 |
| 2008/0133504 A1 | 6/2008 | Messer et al. |
| 2008/0148317 A1* | 6/2008 | Opaluch .............. H04N 21/466 725/46 |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0282294 A1 | 11/2008 | Carpenter et al. |
| 2008/0288641 A1 | 11/2008 | Messer et al. |
| 2008/0288644 A1 | 11/2008 | Gilfix et al. |
| 2008/0301320 A1 | 12/2008 | Morris |
| 2008/0301732 A1* | 12/2008 | Archer ................ H04N 21/252 725/40 |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung et al. |
| 2009/0133025 A1 | 5/2009 | Malhotra et al. |
| 2009/0164904 A1 | 6/2009 | Horowitz et al. |
| 2009/0183210 A1* | 7/2009 | Andrade .......... G06F 17/30817 725/87 |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0023966 A1* | 1/2010 | Shahraray .......... H04N 5/44543 725/34 |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0176787 A1* | 7/2011 | DeCamp ....................... 386/241 |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2011/0289098 A1 | 11/2011 | Oztaskent et al. |
| 2012/0002111 A1 | 1/2012 | Sandoval et al. |
| 2012/0011550 A1 | 1/2012 | Holland |
| 2012/0054811 A1 | 3/2012 | Spears |
| 2012/0066602 A1 | 3/2012 | Chai et al. |
| 2012/0117151 A1 | 5/2012 | Bill |
| 2012/0185905 A1 | 7/2012 | Kelley |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0007043 A1 | 1/2013 | Phillips |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0170813 A1 | 7/2013 | Woods et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0332855 A1 | 12/2013 | Roman et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0026068 A1 | 1/2014 | Park et al. |
| 2014/0032473 A1 | 1/2014 | Enoki et al. |
| 2014/0053078 A1 | 2/2014 | Kannan |
| 2014/0068648 A1 | 3/2014 | Green et al. |
| 2014/0075465 A1 | 3/2014 | Petrovic et al. |
| 2014/0082519 A1 | 3/2014 | Wang et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |

(56) References Cited

U.S. PATENT DOCUMENTS

| | | | |
|---|---|---|---|
| 2014/0325359 A1 | 10/2014 | Vehovsky et al. |
| 2014/0327677 A1 | 11/2014 | Walker |
| 2014/0334381 A1 | 11/2014 | Subramaniam et al. |
| 2014/0359662 A1 | 12/2014 | Packard et al. |
| 2014/0365302 A1 | 12/2014 | Walker |
| 2014/0373032 A1 | 12/2014 | Merry et al. |
| 2015/0020096 A1 | 1/2015 | Walker |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| CA | 2845465 | 3/2014 |
| EP | 0624039 A2 | 11/1994 |
| EP | 0963115 A1 | 12/1999 |
| EP | 1058999 A1 | 12/2000 |
| EP | 1080582 A1 | 3/2001 |
| EP | 99175979.5 | 11/2009 |
| EP | 13192112.4 | 11/2013 |
| EP | 14159227.9 | 3/2014 |
| GB | 2323489 A | 9/1998 |
| GB | 2 448 875 A | 11/2008 |
| GB | 2448874 A | 11/2008 |
| WO | 9963757 A1 | 12/1999 |
| WO | 0011869 A1 | 3/2000 |
| WO | 0033576 A1 | 6/2000 |
| WO | 0110115 A1 | 2/2001 |
| WO | 0182613 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 2003/026275 A2 | 3/2003 |
| WO | 2007115224 A2 | 10/2007 |
| WO | 2008053132 A1 | 5/2008 |
| WO | 2011/053271 A1 | 5/2011 |
| WO | 2012/094105 A1 | 7/2012 |
| WO | 2012/154541 A1 | 11/2012 |

OTHER PUBLICATIONS

European Search Report dated Mar. 1, 2010.
Salton et al., Computer Evaluation of Indexing and Text Processing Journal of the Association for Computing Machinery, vol. 15, No. 1, Jan. 1968, pp. 8-36.
Smith, J.R. et al., An Image and Video Search Engine for the World-Wide Web Storage and Retrieval for Image and Video Databases 5, San Jose, Feb. 13-14, 1997, Proceedings of Spie, Belingham, Spie, US, vol. 3022, Feb. 13, 1997, pp. 84-95.
Kontothoanassis, Ledonias et al. "Design, Implementation, and Analysis of a Multimedia Indexing and Delivery Server", Technical Report Series, Aug. 1999, Cambridge Research Laboratory.
Messer, Alan et al., "SeeNSearch: A context Directed Search Facilitator for Home Entertainment Devices", Paper, Samsung Information Systems America Inc., San Jose, CA.
Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.
Changsheng Xu et al., "Using Webcast Text for Semantic Event Detection in Broadcast Sports Video", IEEE Transactions on Multimedia, vol. 10, No. 7, pp. 1342-1355, Nov. 2008.
Liang Bai et al., "Video Semantic Content Analysis based on Ontology", International Machine Vision and Image Processing Conference, pp. 117-124, Sep. 2007.
Koskela M. et al., "Measuring Concept Similarities in Multimedia Ontologies: Analysis and Evaluations", IEEE Transactions on Multimedia, vol. 9, No. 5, pp. 912-922, Aug. 2007.
Steffan Staab et al., "Semantic Multimedia", Reasoning Web; Lecture Notes in Computer Science, pp. 125-170, Sep. 2008.

U.S. Appl. No. 12/343,790—Office Action dated May 23, 2011.
European Search Report for Application No. 09180776.8, dated Jun. 7, 2010, 9 pages.
European Search Report, EP 09 18 0762, completion date Mar. 22, 2010.
European Search Report dated Jun. 4, 2010.
EP Application No. 09 179 987.4-1241—Office Action dated Feb. 15, 2011.
European Application No. 09 175 979.5—Office Action dated Apr. 11, 2011.
European Patent Application No. 09175979.5—Office Action dated Dec. 13, 2011.
Canadian Patent Application No. 2,685,833—Office Action dated Jan. 20, 2012.
Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Fernando Pereira, "The MPEG-4 Book", Prentice Hall, Jul. 10, 2002.
Michael Adams, "Open Cable Architecture", Cisco Press, Dec. 3, 1999.
Andreas Kraft and Klaus Hofrichter, "An Approach for Script-Based Broadcast Application Production", Springer-Verlag Brling Heidelberg, pp. 74-82, 1999.
Mark Riehl, "XML and Perl", Sams, Oct. 16, 2002.
MetaTV, Inc., PCT/US02/29917 filed Sep. 19, 2002, International Search Report dated Apr. 14, 2003; ISA/US; 6 pages.
Sylvain Devillers, "Bitstream Syntax Definition Language: an Input to MPEG-21 Content Representation", Mar. 2001, ISO, ISO/IEC JTC1/SC29/WG11 MPEG01/M7053.
Shim, et al., "A SMIL Based Graphical Interface for Interactive TV", Internet Tech. Laboratory Dept. of Comp. Engineering, San Jose State University, pp. 257-266, 2003.
Yoon, et al., "Video Gadget: MPET-7 Based Audio-Visual Content Indexing and Browsing Engine", LG Electronics Institute of Technology, 2001, pp. 59-68.
Watchwith webpage; http://www.watchwith.com/content_owners/watchwith_platform_components.jsp (last visited Mar. 12, 2013).
Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).
"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).
European Extended Search Report—EP 13192112.4—dated May 11, 2015.
CA Response to Office Action—CA Appl. 2,685,833—dated Jul. 17, 2015.
Response to European Office Action—European Appl. 13192112. 4—dated Dec. 9, 2015.
Canadian Office Action—CA 2,685,833—dated Jan. 22, 2015.
Ca Office Action—CA App 2,685,833—dated Jan. 27, 2016.
European Office Action—EP App 14159227.9—dated Jul. 12, 2016.
Agnieszka Zagozdzinnska et al. "TRIDAQ Systems in HEP Experiments at LHC Accelerator" Kwartalnik Elektroniki I Telekomunikacji, vol. 59, No. 4, Jan. 1, 2013.
Mar. 9, 2018—European Office Action—EP 13192112.4.
Feb. 19, 2018—European Summons to Oral Proceedings—EP 14159227.9.
Jul. 31, 2018—European Decision to Refuse—14159227.9.
Nov. 6, 2019—Canadian Office Action—CA 2,832,800.
Apr. 21, 2020—European Summons to Oral Proceedings—EP 09175979.5.

(56) References Cited

OTHER PUBLICATIONS

Aug. 24, 2020, Canadian Office Action, CA 2,832,800.
Sep. 5, 2019—Canadian Office Action—CA 2,685,833.
CA Office Action—CA Application 2685833—dated Feb. 8, 2017.
Nov. 29, 2017—Canadian Office Action—CA 2,685,833.

* cited by examiner

METHOD AND APPARATUS FOR DELIVERING VIDEO AND VIDEO-RELATED CONTENT AT SUB-ASSET LEVEL

FIELD OF THE INVENTION

The invention pertains to the delivery to consumers of personalized video and video-related content at the sub-asset level. More particularly, the invention pertains to search and discovery software that can, for example, be embodied within a set-top box, Internet browser, intelligent television, intelligent radio, or the like.

BACKGROUND OF THE INVENTION

The current paradigm for delivery of audio and video services, radio services and Internet services to consumers, be it over-the-air broadcasts, cable television service, Internet television service, telephone network television service, satellite television service, satellite radio service, websites, etc., delivers a relatively unpersonalized, generic experience to all viewers. That is, for example, all of the subscribers of a given television network system receive essentially the same content in essentially the same order.

Cable and satellite television services and websites permit some personalization in that many such television network systems permit each individual viewer to access and download Video-on-Demand content. The Video-on-Demand feature (VOD) may be considered to comprise personalization in some sense because it allows a viewer to select content for viewing at any time of his or her choice that is different from content being provided to other subscribers. However, the typical VOD feature provided by television network operators is generic in the sense that the VOD options (e.g., the programs available for viewing on demand) are the same for all subscribers and are presented in the same manner to all subscribers. Furthermore, the items available for consumption via the VOD feature are complete assets. For instance, a subscriber using the VOD feature is enabled to select and download and view an entire asset, such as a television program, a music video, movie, instructional video, etc., but not a particular portion thereof.

United States Patent Application Publication No. 2008/0133504 discloses a method and apparatus for contextual search query refinement on consumer electronics devices. In the disclosed method and apparatus, a consumer electronics apparatus, such as a television, is enabled to search the Internet for content, the search being performed and refined based on contextual information, such as the consumer electronic device's current activity, e.g., playing a music CD or playing a DVD, and the actual content of the media. While the method and apparatus disclosed in that patent application provides additional content for potential viewing by a subscriber, there is no customization or personalization of the content in that each subscriber will receive the same search results for a search performed in a particular context (e.g., the particular song playing on a particular CD). The specific search results depend solely on the particular context of the media, and not anything particular to the specific subscriber.

SUMMARY OF THE INVENTION

The invention pertains to a method and apparatus for delivering an ordered list of items of supplemental content to a consumer comprising determining a context of a portion of media selected for consumption, determining user preference information corresponding to the consumer, and generating the ordered list of items of supplemental content as a function of the context and of the consumer preference information.

DETAILED DESCRIPTION OF THE INVENTION

The present invention pertains to methods and apparatus for automatically presenting to a consumer of a media asset a customized set of optional media content, the optional media content being automatically selected and presented to the consumer as a function of the media asset currently being consumed and the predicted personal preferences of the consumer himself or herself.

In one particular embodiment in connection with which the invention will first be described for exemplary purposes, the invention is presented in the context of a television network system, such as cable television. However, it should be understood that this embodiment is merely exemplary and that the principles of the present invention can be applied in other information networks, including the Internet, and satellite radio networks.

"Information network" refers to a collection of devices having a transport mechanism for exchanging information or content between the devices. Such networks may have any suitable architecture, including, for example, client-server, 3-tier architecture, N-tier architecture, distributed objects, loose coupling, or tight coupling.

Figure 1:
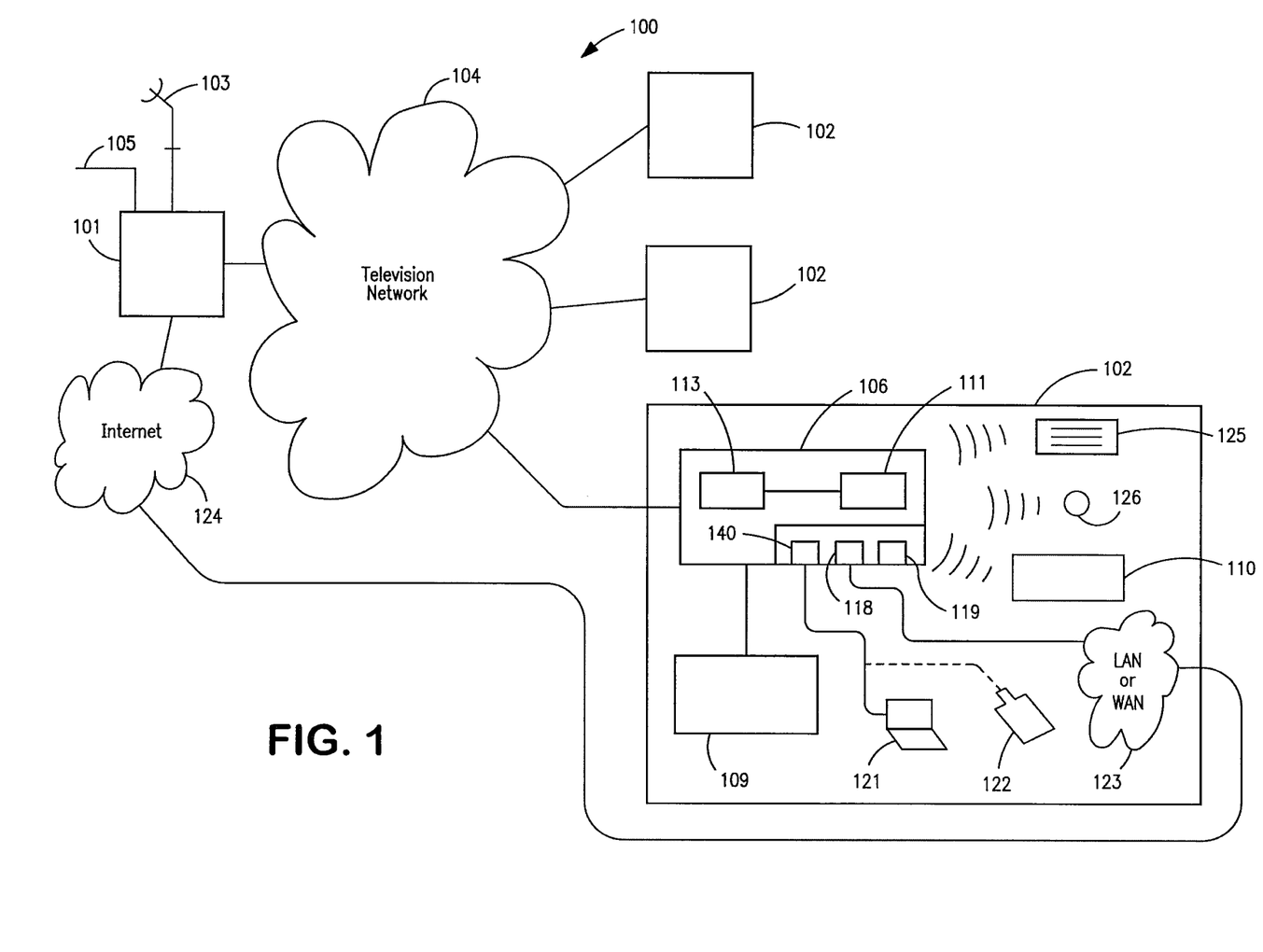
FIG. 1 is a block diagram of the components of an exemplary cable television network system that supports features in accordance with the present invention.

FIG. 1 is a block diagram illustrating a set of components found in a cable television system 100 in which the present invention can be incorporated. Cable network system 100 includes a server, such as a headend 101, that receives content that is to be transmitted to the subscriber locations 102 of the cable network system.

The term "transmitted" or "transmits" refers broadly to sending a signal from a transmitting device to a receiving device. The signal may be transmitted wirelessly or over a solid medium such as wire or fiber. Furthermore, the signal may be broadcast, multicast/narrowcast, or unicast. Broadcasting refers to the transmission of content to an audience at large. The audience may be the general public, or a sub-audience. Switched digital video is a type of broadcast that is initiated in response to a client request and is terminated when no more clients are tuned to it. Multicasting refers to the simultaneous transmission of content to a plurality of specific and known destinations or addresses in a network or between networks. Multicast is often used for streaming media and Internet television applications, Ethernet multicast addressing, ATM point-to-multipoint VCs and Infiniband® multicast. Unicasting refers to the transmission of a signal to a single destination or address in a network. Unicast is used, for example, in Video-On-Demand applications.

The headend 101 receives the content to be broadcast from one or more sources, for example, such as a satellite 103 or a landline 105. The data is modulated at the headend 101 for distribution over the medium of the network 104, e.g., coaxial cable, optical fiber, wireless satellite communication, etc., to the subscriber locations 102 in their individual homes, businesses, cars, etc. One particular exemplary subscriber location 102 is shown in detail in FIG. 1. Typically, each subscriber will have a client device, such as a radio receiver, computer terminal, or set top box 106, in communication with the server through the network 104.

"Set top box" or STB refers to a device that connects to a monitor and an external source of signal, converting the signal into content for display/transmission over the monitor. The signal source might be an Ethernet cable, a satellite dish, a coaxial cable, a fiber optic cable, a telephone line (including DSL connections), Broadband over Power Line, or even an ordinary antenna. The STB may have several different embodiments. For example, it may be a special digital STB for delivering digital content on TV sets that do not have a built in digital tuner. The STB may also descramble premium channels. A STB may be a cable converter box to receive digital cable TV channels and convert them to analog for non-digital TVs. In the case of direct broadcast satellite (mini-dish) systems such as SES Astra®, Dish Network®, or DirecTV®, the STB is an integrated receiver/decoder (or IRD). In internet packet (IP) TV networks, the STB is a small computer providing two-way communications on an IP network, and decoding the video streaming media which eliminates the need for any coaxial cabling. The STB may be a discrete unit or its functionality may be incorporated into other components of the user's system such as the monitor, TV, DVR, residential gateway, or personal computer. For example, the STB may be a portable, modular unit (i.e., a personal STB) or it may be integrated into a stationary TV system. The STB may contain one or more digital processors or may use the processing capabilities of the other system components (e.g., TV, DVR, personal computer). Additionally, rather than having its own tuner, the STB may use the tuner of a television.

A set top box 106 commonly will be connected to provide its output to a monitor 109, such as a television set. Commonly, a handheld remote control unit 110 communicates wirelessly (e.g., infrared) with the set top box 106 to control functions and operations of the set top box 106.

The set top box 106 is capable of receiving the content signals, permitting the user to select a particular channel for viewing, and demodulating the content on that channel to a form that can be displayed on the subscriber's television or other monitor 109. The STB further may control access to various channels and other content, such as on demand, pay-per-view programs, premium channels, etc., based on permissions granted to each individual subscriber based on their subscription plan, parental controls, and other criteria.

The set top box 106 can, not only receive data from the headend 101 through the network 104, but also transmit data upstream to the headend 101. For instance, set top boxes commonly transmit data upstream for purposes of ordering VOD or pay-per-view content.

The set top box 106 includes a processor 113 for running software to provide various functions. Preferably, it further includes a memory storage device, such as a hard disk drive 111, for recording television programs and/or other content. Set top boxes with this recording capability are commonly referred to as digital video recorder (DVR) set top boxes (STBs) or DVR-STBs. They provide the user the ability to search through upcoming television programming and selectively designate certain programs of the user's choosing to be recorded. The set top box 106 is programmed to provide various graphical user interfaces (GUIs), such as in the form of menus, permitting the user to interact (typically using the remote control unit 110) with the set top box 106 and/or the headend 101.

The set top box 106 may further include an input terminal 118 for connecting to a LAN or WAN 123 (preferably with connectivity to the Internet 124). Alternately or additionally, connectivity to the Internet 124 may be provided through the television network 104 itself via the headend 101.

The set top box 106 may be configured with Internet browser software and software for permitting users to interface with the Internet browser software, such as through a keyboard 125 and/or mouse 126.

In accordance with the present invention, a user of an information network (any system through which a user can access information), is offered supplemental content, the supplemental content being selected and/or organized as a function of both the user's personal preferences and the information currently being consumed by the user (i.e., the context). Furthermore, in a preferred embodiment of the invention, the supplemental content is offered on a sub-asset level. That is, the supplemental content is provided in units that may be smaller than the units in which that type of information conventionally is offered for consumption. Media items are typically offered by programmers and network operators in generally predefined portions herein termed assets. For instance television programs such as dramas, soap operas, reality shows, and sitcoms are typically broadcast in asset level units known as episodes that commonly are a half hour or an hour in length (including advertisements). Sporting events are broadcast in asset units of a single game. Music videos are commonly offered in asset units corresponding to a complete song or a complete concert performance.

The definition of the term "asset" is well understood in the industry as well as among content consumers. For instance, a typical programming guide printed in a newspaper or the electronic program guides commonly provided by a subscriber-based television network are well known to virtually all television viewers and generally list multimedia content at the asset level.

In any event, a media asset typically can conceptually be broken down into a plurality of segments at the sub-asset level, each having a cohesive context or theme. "Context" or "contextual information" refers broadly to the subject matter or theme of the content and can be virtually anything within the realm of human knowledge, such as baseball, strike out, fast ball, stolen base, mountains, scary, happy, George Carlin, nighttime. The nature and duration of each segment will depend, of course, on the particular ontology used for purposes of segmentation as well as on the particular content of each program. "Content" refers broadly to the information contained in the signal transmitted, and includes, for example, entertainment, news, and commercials. For instance, most stage plays, and motion pictures readily break down into two or three acts. Each such act can be a different segment. Television programs also can be segmented according to thematic elements. Certain programs, for instance, the television news magazine program 60 Minutes can readily be segmented into different news stories. Other programs, however, can be segmented based on more subtle thematic elements. A baseball game can be segmented by inning, for instance. A typical James Bond movie can be segmented into a plurality of action segments, a plurality of dramatic segments, and a plurality romantic segments. The possibilities for segmentation based on thematic elements is virtually limitless and these are only the simplest of examples.

In accordance with the present invention as will be described in more detail below, information is offered in segments smaller than asset level units. For example, supplemental content may be offered in the form of individual coherent scenes from a television program or motion picture, a portion of a music video, a particular news report within a news program, a coherent portion of a Web page, the chorus portion of a song, etc.

The invention is perhaps best described initially by way of an example. Accordingly, an exemplary embodiment of the invention as implemented in connection with a television network (cable, satellite, Internet, telephone, fiber optic, etc.) will be described herein below in connection with FIGS. 2 and 3.

Let us consider an individual consumer who is watching a particular television program, in this example, a major league baseball game between the Philadelphia Phillies and the New York Mets. In accordance with this particular exemplary embodiment, the consumer is permitted at any time during the program to activate a supplemental content search feature (hereinafter F-Search). Activation of this feature may be provided through any reasonable means, such as a dedicated button on a remote control unit or portable consumer device (e.g., a smart phone, a media player, etc.) or a hyperlink in a Web browser. When the feature is thus selected, the local device, for instance, sends a signal upstream to a server requesting invocation of the F-Search feature. In response, the server performs a search for supplemental content that pertains to the context of the particular content being consumed by that consumer at that time. Furthermore, in a preferred embodiment, the supplemental content is organized for presentation to the consumer in a manner that is a function of user preferences. For instance, the results may be ordered from highest to lowest relevance or importance as a function of the user preferences. The content may not only be ordered at least partially as a function of user preferences, but may be actually selected for inclusion in the list of supplemental content as a function of user preferences.

Even further, the supplemental content offered to the user may comprise at least some media items at the sub-asset level. Supplemental content offered at the sub-asset level may include content from both the current context, i.e., the Philadelphia Phillies vs. New York Mets game currently being watched, as well as sub-asset level content from media items not currently being consumed by the user.

Figure 2:
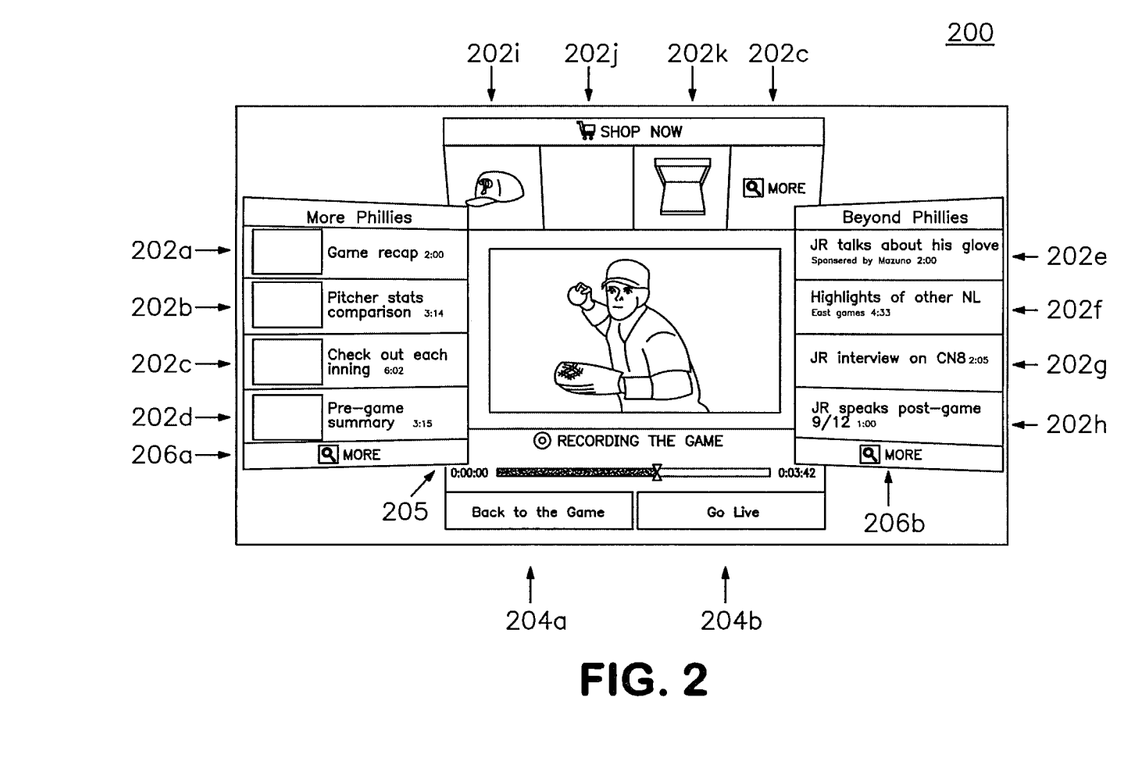
FIG. 2 is an exemplary interface screens that can be used in connection with the present invention.

The exact form in which the items of supplemental content are presented to the user can be any reasonable form. FIG. 2 shows one particular possible interface in the form of a graphical user interface (GUI) 200 that the user can interact with very simply via the use of one or more navigation buttons (e.g., UP, DOWN, LEFT, and/or RIGHT buttons) and a SELECT button. In this particular example, the program that the consumer was originally watching is paused, but remains on the display in a small window 201 in the center of the display and surrounded by a plurality of icons, each representing either an individual item of supplemental media content or a list of items of supplemental content. In this example, each icon comprises a button 202a-202k that the user may select by navigating to it and selecting it. In other embodiments, the media originally being consumed may disappear from the screen and/or the item of supplemental content may be shown in a numbered list from which the user can select an item by entering its number on the remote-control unit.

In a preferred embodiment of the invention, only a limited number of media items deemed to be the most relevant items of supplemental content are presented on the display at any given time. In this example, the results are broken down into three categories. However, this is merely exemplary and the media items of supplemental content can be in a single or any other number of lists. First, on the left-hand side of the main window 201, a list of four items 202a, 202b, 202c, 202d of supplemental content pertaining to one or both of the teams playing the game is provided. Second, on the right-hand side of the main window, a list of four items 202e, 202f, 202g, 202h of supplemental content relevant to the program and scene, but not specifically related to the teams is presented. Third, above of the main window 201, the subscriber is presented with three more items 202i, 202j, 202k of supplemental content pertaining to the purchase of merchandise and the like. In this case, the subscriber is presented with the opportunity to buy goods and/or services deemed relevant to the program being viewed. In this example, item 202i allows the subscriber to purchase Philadelphia Phillies baseball caps. Item 202j allows the subscriber to purchase Philadelphia Phillies Jackets. Finally, item 202k allows the subscriber to order pizza delivery online.

The supplemental content on both the left hand and right hand sides of the picture are ordered according to the determined user preferences.

In addition, beneath the main window, is a time bar 205 that shows the point at which the game was paused relative to the current real-time of the game broadcast. Beneath that are two more options. The first one 204a allows the consumer to exit out of the F-Search GUI and return to the program being viewed starting from the point at which the program was paused. The other option 204b exits the F-Search feature and returns the consumer to the program at the current real-time point in the game broadcast.

In addition, for each of the three categories into which the supplemental content items is organized in this particular embodiment, there is a MORE button 206a, 206b, 206c. The selection of one of the MORE buttons causes the next most relevant items of supplemental content in that particular category to appear on the screen in the place previously occupied by the preceding list of first most relevant items. In a preferred embodiment, the user is permitted to click on each MORE button multiple times to continue to view additional items of supplemental content of lesser and lesser relevance.

As previously noted, the search engine selects and organizes items of supplemental content as a function of both (1) the context in which the F-Search feature was invoked (i.e., the particular program and scene being viewed) and (2) predetermined user preferences. For instance, as previously mentioned, let us assume that the program being viewed is a baseball game between the Philadelphia Phillies and the New York Mets and the particular scene during which F-Search was invoked was immediately after Philadelphia Phillies shortstop Jimmie Rollins made a spectacular catch to rob New York Mets batter Marlon Anderson of a base hit. Accordingly, relevant supplemental content may include, for instance, a recorded interview with Jimmie Rollins, a recorded interview with Marlon Anderson, a highlight reel of great plays by Jimmie Rollins, a highlight reel of great hits by Marlon Anderson, New York Mets season statistics, Philadelphia Phillies season statistics, career statistics for Jimmie Rollins, career statistics for Marlon Anderson, the current team standings, results of other baseball games being played that day, etc.

The relevance of each of these items of supplemental content to the viewer may be highly dependent on the particular viewer. For instance, a fan of the Philadelphia Phillies probably would probably deem the highlight clips of Marlon Anderson or the career statistics of Marlon Anderson as possessing low relevance. Conversely, a Mets fan viewing the same game and scene would deem these same pieces of content as highly relevant.

Thus, the F-Search feature not only automatically detects the context in which the F-Search feature was invoked, and uses the contextual information to search for supplemental contents, but also utilizes a prediction as to the particular viewer's preferences in selecting supplemental content and/or ordering the items of supplemental content. In one embodiment of the invention, the list or lists of items of supplemental content is determined as a function of the context without consideration of user preferences and then those items are ordered for presentation in terms of relevance as a function of user preferences. However, in other embodiments, the selection of items for inclusion in the list itself can be a function of both context and user preferences.

Context can be determined in an automated fashion through the use of one or more of several technologies. Of course, it is possible to do this by human effort, i.e., a person watches media assets and manually takes note of coherent segments and their thematic elements and then enters the information in a database. However, with the sheer volume of media content available today and which is only likely to increase exponentially in the future, at least some automation of the process would be highly desirable.

Many software systems are available now that can be adapted for use in connection with this task. For instance, software is now available that can capture the closed caption stream within a media asset and convert it to written text, which could then be analyzed for context. Further, software is available that can analyze the audio portion of a media stream and convert speech detected in the audio text (which can then further be analyzed for context). In fact, software is now available that can analyze the audio portion of a media stream to determine additional contextual information from sounds other than speech. For instance, such software can detect, recognize and distinguish between, for instance, the sound of a crowd cheering or a crowd booing, sounds associated with being outdoors in a natural setting or being outdoors in an urban setting or being indoors in a factory or an office or a residence, etc. For example, U.S. Pat. No. 7,177,861 discloses suitable software for detecting semantic events in an audio stream.

Even further, optical character recognition software can be used to determine text that appears in a scene (as opposed to being audibly spoken). See, e.g. Li, Y. et al. "Reliable Video Clock Recognition," Pattern Recognition, 2006, 1CPR 2006, 18$^{th}$ International Conference on Pattern Recognition. Such software can be used, for instance, to detect the clock in a timed sporting event. Specifically knowledge of the game time could be useful in helping determine the nature of a scene. For instance, whether the clock is running or not could be informative as to whether the ball is in play or not during a football game. Furthermore, certain times during a sporting event are particularly important, such as two minutes before the end of a professional football game. Likewise, optical character recognition can be used to determine the names of the actors or other significant persons in a television program or the like simply by reading the credits at the beginning or end of the program.

Furthermore, video analytics software is available that can analyze the visual content of a media stream to determine context, e.g., indoors or outdoors, presence or absence of cars and other vehicles, presence or absence of human beings, presence or absence of non-human animals, etc. In fact, software is available today that can be used to actually recognize specific individuals by analyzing their faces.

Even further, there may be significant metadata contained in a media stream. While some may consider the closed captioning stream to be metadata, we here refer to additional information. Particularly, the makers or distributors of television programs or third party providers sometimes insert metadata into the stream that might be useful in determining the context of an asset or of a segment within an asset. Such metadata may include almost any relevant information, such as actors in a scene, timestamps identifying the beginnings and ends of various segments within a program, the names of the teams in a sporting event, the date and time that the sports event actually occurred, the number of the game within a complete season, etc. Accordingly, the system may also include software for analyzing such metadata.

Even further, companies now exist that provide the services of generating and selling data about television programs and other media assets. For instance, Stats, Inc. of Northbrook, IL, USA sells such metadata about sporting events. Thus, taking a baseball game as an example, the data may include, for instance, the time that each half inning commenced and ended, data for each at bat during the game, such as the identity of the batter, the times at which the at-bat commenced and ended, the statistics of each player in the game, the score of the game at any given instance, the teams playing the game, etc.

User preferences likewise can be determined from various sources of information readily available to website operators, radio network operators, television network, etc. For instance, this may include the geographic location of the user, information about the user's household members (such as ages, professions, personal interests), that may have been obtained from a user directly when the user subscribed to the service (or that can be obtained through third-party services that provide such data for a fee). Other sources of data include demographic data about the geographic area in which a user lives.

Perhaps most significantly, user preference data can be obtained from the user's media consumption habits, (subject to the user's consent to collect such data). Particularly, a media service provider, such as a cable television network or website, may record and maintain records of (1) all linear programs consumed by a media consumer, (2) programs viewed via VOD, (3) the specific subscription plan purchased by the consumer (if it is a subscription-based service), (4) the programs the consumer recorded on his or her DVR-STB or computer, (5) how often particular programs have been consumed (either linearly or through use of a DVR-STB or other recording device or software), (6) how often particular scenes within a program are consumed by the consumer, and (7) the consumer's past consumption of supplemental content via usage of the F-Search feature (particularly, the specific items of supplemental content selected from the search results presented). The term "linear" above or "linear consumption" refers to how a person consumes (e.g., watches) television programs in real time as they are being broadcast by a content provider.

Merely as an example, a user living in Philadelphia that has watched every Philadelphia Phillies game broadcast since subscribing to the television service and that has ordered VOD programs pertaining to the Philadelphia Phillies, and for whom a large portion of his or her television consumption comprises sporting events involving Philadelphia area teams, and who has never watched a New York Mets game (except for when the New York Mets are playing the Philadelphia Phillies) can easily be predicted to be more interested in a highlight reel pertaining to Jimmie Rollins than a highlight reel pertaining to Marlon Anderson.

The prediction of relevance of any item of supplemental content as a function of user preferences can be performed using a multi-variable regression equation having as its input data the aforementioned variables such as linear television consumption, VOD television consumption, geographic data, demographic data, etc., the particular variables. The weighting coefficient applied to each variable, and the specific equation (e.g., least mean squares) would all depend on the particular available information, experimentation with different variables. The variable, the weighting factors, the equations, and other factors can be modified and updated periodically based on historical performance and even possibly user satisfaction surveys.

The selection of the items of supplemental content based on context also may be performed using any reasonable multi-variable regression equation having as its inputs, for example, any one or more of the aforementioned variables, such as the closed-captioning stream, the video analytics output stream, the audio analytics output stream, the metadata associated with the program, etc.

The equipment for providing functionality in accordance with the invention may reside at any reasonable location in the network, such as at a headend or server, at a content management center, or even at the set top box, Web browser, radio receiver, or other device local to the consumer. The most likely embodiments of the invention will comprise software programs running on digital processing devices such as computers, microprocessors, digital processors, etc. However, at least parts of the functionalities set forth herein could also be complemented by other means such as ASICs (Application Specific Integrated Circuits), FPGAs (Field Programmable Gate Arrays), state machines, combinational logic circuits, analog circuits, human operator, and any combination of the above.

The software and/or other circuits may be distributed among different nodes of a network, such as a server and a client node. Also, the software may be embodied in any form of memory that can be associated with a digital processing apparatus, including, but not limited to RAM, ROM, PROM, EPROM, EEPROM, DRAM, Compact Disc, Tape, Floppy Disc, DVD, SD memory devices, Compact Flash memory devices, USB memory devices, etc.

In some embodiments, some or all of the items of supplemental content can be pre-determined. That is, for instance, even in a broadcast of a live event, such as a broadcast of a live baseball game, some items of supplemental content can be preset, such as the season records of the two teams that are known to be playing the game. Other items of supplemental content can be found (or even generated) in real time in response to the particular context. Generating and/or finding items of supplemental content in real time based on contextual information can be accomplished easily. Particularly, once the context is determined, the generation of the items of supplemental content can be generated via a search on the Internet similar to the searches performed by any Internet search engine. The context determination can be performed and formulated into a search query in a fraction of a second and the search for items of supplemental content based on that query also can be performed in a fraction of a second. Finally, the list of items of supplemental content can be run through a regression analysis that will order the items in a selected order within a fraction of a second. The entire process can readily be performed in substantially less than a second.

In other systems, most or all of the items of supplemental content can be predetermined. For instance, when viewing a motion picture (as opposed to a live performance or event), the content of the motion picture may be analyzed ahead of time and some or all of the supplemental content to be made available at any given instant in the motion picture can be pre-determined. For instance, it is widely known that the Star Wars series of movies contains many light saber fight scenes and that many fans of the series are particularly interested in the light saber fight scenes. Accordingly, the individual light saber scenes from the various movies in the series may be pre-ordained as items of supplemental content when the F-Search feature is activated during the viewing of any particular light saber fight scene within a Star Wars movie. In one embodiment of the invention, each scene can be contained in the list of supplemental content items as a separate item. However, in another embodiment, one of the items of supplemental content may be, for instance, "See other light saber fight scenes." If the user chooses that item, the user may be taken to a new menu from which the user can select from a list of light saber fight scenes.

As previously mentioned and as illustrated in the immediately preceding example, items of supplemental content can be provided at the sub-asset level, e.g., light saber fight scene, as opposed to the asset level, e.g., an entire Star Wars movie.

The same basic software used to determine the context of a scene being consumed can likewise be used in software that analyzes media assets and breaks them down into contextually coherent segments at the sub-asset level. More particularly, as an example, the same software that determines that a particular scene being consumed is a light saber fight scene (such as based on sound effects, motion progression in the scene, and meta data associated with the program and/or scene) can readily be applied in the process of identifying the light saber fight scenes within a Star Wars movie for purposes of segmenting a media asset into contextually coherent sub-asset level media segments, including determining the beginning and the end of the light saber fight scene in order to create a coherent sub-asset.

In the particular above-described embodiment, the process of generating the ordered list of items of supplemental content is broken into two separate and distinct steps, namely, generation of the list of search results as a function of context and then ordering of the list as a function of predicted user preferences. However, as previously mentioned, this is merely exemplary. The generation and ordering of the list can be performed together as a function of both context and predicted user preferences.

In one preferred embodiment of the invention, the F-Search feature is available at any time during the consumption of any media asset. Search results can be generated at least partially in real time based on analyzed context and analyzed user preferences. However, the media provider also may pre-identify particular portions of particular media assets as being particularly suitable for supplemental content and, as previously mentioned, may have pre-generated supplemental content particularly relating to such scenes. Thus, in accordance with one preferred embodiment of the invention, a cable television network operator may insert a F-Search icon into the display during such scenes that, in essence, alerts the user to the availability of particularly interesting supplemental content and/or invites the user to activate the F-Search feature.

In some embodiments of the invention, the media being consumed continues to stream during use of the F-Search feature. However, the user can choose to pause the program while using the F-Search feature. In other embodiments, the media may be automatically paused upon activation of the feature. The user may be given the option of continuing to view the original asset.

The invention preferably is implemented primarily or exclusively by software (including appropriate databases) running on a server at a content center, head end, or any other content node of the network. However, portions or all of the functions in accordance with the principles of the invention can be implemented via software and/or hardware and may comprise any one or more of a microprocessor, a processor, combinational logic, a state machine, analog circuitry, digital circuitry, an Application Specific Integrated Circuit (ASIC), a Programmable Logic Array (PLA), any other conventional computing apparatus and/or combinations of any of the above. In other embodiments, the invention may be implemented at the user nodes, such as a set top box or intelligent television.

Figure 3:
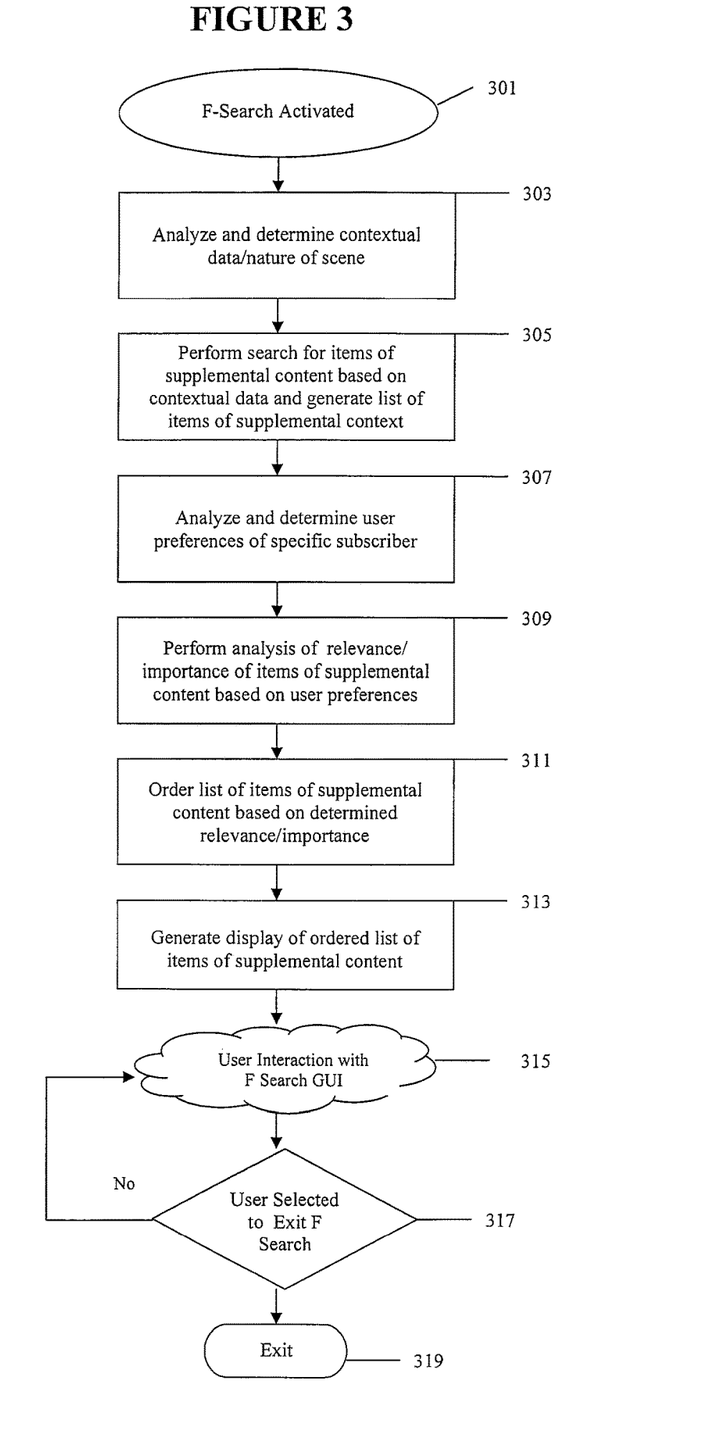
FIG. 3 is a flow diagram illustrating flow according to one exemplary process for generating search results for presentation to a viewer in accordance with the principles of the present invention.

FIG. 3 is a flow diagram illustrating process flow in accordance with one particular exemplary embodiment of the invention. At step 301, process is commenced responsive to the user activating the F-Search feature. Next, in step 303, software performs an analysis to determine context, e.g., the nature of the scene currently being displayed. As previously mentioned, this may include a regression analysis of the available data about the scene. Such data may include metadata contained in the stream, analysis of the closed captioning stream, video analytics, and/or audio analytics. Next in step 305, a search is performed for items of supplemental content as a function of the determined contextual data and a list is generated of items of supplemental content. Next, in step 307, user preferences are determined for the specific user. As previously mentioned, this also can be performed by a regression analysis based on any or all of the available data about the user, including, for instance, user-provided data such as address, income level, age, gender, demographic data, and viewing habit data collected by the network operator.

In step 309, the system performs an analysis of the importance of the items of supplemental content that were generated in step 305 based on these determined user preferences. In step 311, that list is ordered as a function of the determine relevance/importance. Next, in step 313, the system generates a display with a suitable GUI showing the ordered list of items of supplemental content.

At this point, the user can now interact with the list of supplemental content to select items for viewing, pause the original program, etc. The flow diagram shows this interaction generally at step 315, the details of which can take any number of forms, many of which will be readily apparent to those persons of skill in the related arts and therefore are not shown in detail. Some of the items of supplemental content may be ordered in a menu tree. For instance, selection of a particular item in the GUI generated in step 313 may actually lead to a sub-list of items of supplemental content.

In any event, the user can interact with the GUI as much as desired, and when the user selects to exit the feature (step 317), flow proceeds to step 319 where the process is exited.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method comprising:
   determining a current portion of content being output for a user;
   determining a first content item associated with the current portion;
   determining, by one or more computing devices and based on the current portion:
      a first supplemental content asset having a first relevancy to the current portion, and
      a second supplemental content asset having a second relevancy, different from the first relevancy, to the current portion; and
   causing output of a listing of the first supplemental content asset and the second supplemental content asset, wherein the listing is ordered based on a determination of whether the user has previously viewed or recorded the first content item.

2. The method of claim 1, wherein the first content item was recorded based on a request by the user, and the method further comprising:
   determining the order of the first supplemental content asset and the second supplemental content asset based on performing regression analysis on first data associated with the first content item recorded by a digital video recorder and additional data indicating that a second content item was output for display during a broadcast of the second content item, wherein the performing of the regression analysis comprises applying a different weight to each of the first data and the additional data.

3. The method of claim 1, wherein each of the first supplemental content asset and the second supplemental content asset comprises a segment of a television program.

4. The method of claim 1, wherein determining the first supplemental content asset and the second supplemental content asset is based on one or more of: video analytics data of the current portion, or audio analytics data of the current portion.

5. The method of claim 1, further comprising:
   inserting, into a data stream that comprises the current portion of content, metadata associated with the current portion, wherein determining the first supplemental content asset and the second supplemental content asset is based on the metadata.

6. The method of claim 1, wherein determining the first supplemental content asset and the second supplemental content asset are performed based on receipt of a request for supplemental content, and the method further comprising:
   causing output of a user interface that includes the listing of the first supplemental content asset and the second supplemental content asset after receipt of the request for supplemental content.

7. The method of claim 1, wherein determining the current portion is performed based on receiving a request for supplemental content; and
   wherein determining the first supplemental content asset and the second supplemental content asset comprises:

performing, using data associated with the current portion, a search for the first and second supplemental content assets.

8. The method of claim 1, wherein determining the current portion is performed based on receiving a request for supplemental content; and
wherein determining the first supplemental content asset and the second supplemental content asset comprises:
performing, using data associated with the current portion, a search for the first and second supplemental content assets via the World Wide Web.

9. The method of claim 1, further comprising:
determining a person depicted in the current portion of the content; and
performing, based on the person, a search that results in at least one additional supplemental content asset, wherein the at least one additional supplemental content asset comprises video depicting the person.

10. The method of claim 7, wherein the request for supplemental content represents a user-activation of a search function, wherein the search function is for supplemental content pertaining to what is depicted in the current portion, and wherein a user interface is configured to provide results of the search function.

11. The method of claim 1, further comprising:
determining, based on the first relevancy of the first supplemental content asset to the current portion and the second relevancy of the second supplemental content asset to the current portion, a plurality of third supplemental content assets;
determining, based on whether the user has viewed or recorded the first content item, an order of the plurality of third supplemental content assets; and
causing output of a user interface that comprises an indication and a listing of the plurality of third supplemental content assets based on the order of the plurality of third supplemental content assets, and wherein the user interface is configured to, based on a user-selection of the indication, initiate a process to purchase merchandise associated with one of the listed plurality of third supplemental content assets.

12. The method of claim 1, wherein the content comprises an event for a sport that is between at least two teams, and the first supplemental content asset comprises supplemental content associated with one of the at least two teams, and wherein the second supplemental content asset comprises supplemental content associated with the sport.

13. The method of claim 1, wherein the listing of the first supplemental content asset and the second supplemental content asset is ordered from highest to lowest importance as determined based on whether the first content item:
was recorded by a digital video recorder; and
was output from the digital video recorder for display.

14. The method of claim 1, wherein the listing is ordered based on:
video-on-demand content that was output for display.

15. The method of claim 1, wherein the listing is ordered based on whether linear content was output for display.

16. The method of claim 1, wherein each of the first supplemental content asset and the second supplemental content asset is one of a television program, a motion picture, a music video, a news program, a Web page, or a song.

17. The method of claim 1, the method further comprising:
determining a topic based on the first content item and a plurality of additional content items the user has previously viewed or recorded, wherein a supplemental content asset of the first supplemental content asset and the second supplemental content asset is selected and output to the user based on the topic.

18. The method of claim 1, the method further comprising:
determining user preferences based on the first content item, wherein the listing is ordered based on a relevancy between the first supplemental content asset and the second supplemental content asset and the user preferences.

19. A method comprising:
determining a current portion of content being output for display;
determining, by one or more computing devices and based on the current portion, a plurality of supplemental content assets;
determining, based on a viewing history of the user or content recorded by a digital video recorder, an order of the plurality of supplemental content assets; and
causing output of a user interface comprising a listing, based on the order, of the plurality of supplemental content assets.

20. The method of claim 19, wherein determining the current portion of content being output for display is performed based on receiving an indication of a user-activation of a supplemental content search function.

21. The method of claim 19, wherein determining the order of the plurality of supplemental content assets comprises performing a regression analysis based on whether the first content item was recorded by the digital video recorder, whether a portion of the first content was output for display at least once from the digital video recorder, and whether second content was output for display during a broadcast of the second content.

22. The method of claim 21, wherein performing the regression analysis comprises applying a first weight to first data indicating whether the first content item was recorded by the digital video recorder, applying a second weight to second data indicating whether a portion of the first content was output for display at least once from the digital video recorder, and applying a third weight to third data indicating whether the second content was output for display during the broadcast of the second content; and
wherein the method further comprises adjusting the first weight or the second weight based on a survey taken by a user associated with the digital video recorder.

23. The method of claim 19, wherein determining the plurality of supplemental content assets comprises:
searching, based on the current portion, for the plurality of supplemental content assets; and
generating a list of the plurality of supplemental content assets by determining, based on data indicating whether the first content item was output for display at least once from the digital video recorder, that each of the plurality of supplemental content assets is to be included in the list.

24. The method of claim 19, wherein each of the plurality of supplemental content assets comprises a segment of a television program.

25. The method of claim 19, wherein determining the order of the plurality of supplemental content assets is based on one or more of: video analytics data of the current portion, or audio analytics data of the current portion.

26. The method of claim 19, further comprising:
inserting, into a data stream that comprises the content, metadata associated with the current portion; and determining, based on the metadata, data associated with the current portion, and
wherein determining the plurality of supplemental content assets is based on the data.

27. The method of claim 19, wherein determining the plurality of supplemental content assets is performed based on a request for supplemental content, and wherein the user interface indicates a response to the request for supplemental content.

28. The method of claim 19, wherein determining the current portion is performed based on receiving a request for supplemental content; and
wherein determining the plurality of supplemental content assets comprises:
performing, using data associated with the current portion, a search for the plurality of supplemental content assets.

29. The method of claim 19, wherein determining the current portion is performed based on receiving a request for supplemental content; and
wherein determining the plurality of supplemental content assets comprises:
performing, using data associated with the current portion, a search for the plurality of supplemental content assets via the World Wide Web.

30. The method of claim 19, wherein determining the current portion is performed based on receiving a request for supplemental content,
wherein determining the plurality of supplemental content assets comprises:
performing, using data associated with the current portion, a search for the plurality of supplemental content assets, and
wherein the request for supplemental content represents a user-activation of a search function, wherein the search function is for supplemental content pertaining to what is depicted in the current portion, and wherein the user interface is configured to provide results of the search function.

31. The method of claim 19, further comprising:
determining a person depicted in the current portion; and
performing, based on the person, a search that results in at least one video depicting the person.

32. The method of claim 19, wherein the content comprises an event for a sport that is between at least two entities, and wherein one or more of the plurality of supplemental content assets is associated with the sport or one of the at least two entities.

33. The method of claim 19, wherein determining the order of the plurality of supplemental content assets is performed by ordering the plurality of supplemental content assets from highest to lowest importance as determined based on whether the first content item was recorded by a digital video recorder and based on whether the first content item was output for display at least once from the digital video recorder.

34. The method of claim 19, wherein determining the order of the plurality of supplemental content assets is performed based on video-on-demand content that was output for display.

35. The method of claim 19, wherein determining the order of the plurality of supplemental content assets is performed based on linear content that was output for display.

36. A method comprising:
determining, based on receiving an indication of a user-activation of a supplemental content search function during a current output of content, a current portion of content;
determining, by one or more computing devices and based on the current portion, a plurality of supplemental content assets;
determining, by the one or more computing devices:
a first plurality of the supplemental content assets having a first relevancy to the current portion, and
a second plurality of the supplemental content assets having a second relevancy to the current portion;
ordering, by the one or more computing devices, based on whether the current portion was previously recorded by a digital video recorder or was previously output for display from the digital video recorder, the first plurality of the supplemental content assets;
ordering, by the one or more computing devices, based on whether the current portion was previously recorded by the digital video recorder or was previously output for display from the digital video recorder, the second plurality of the supplemental content assets; and
causing output of a user interface that comprises a first indication of the ordered first plurality of the supplemental content assets and a second indication of the ordered second plurality of the supplemental content assets.

37. The method of claim 36, wherein ordering the first plurality of the supplemental content assets comprises performing a regression analysis of first data indicating whether the current portion was recorded by the digital video recorder, second data indicating whether a portion of the current portion was output for display from the digital video recorder, and third data indicating whether second content was output for display during a broadcast of the second content, wherein performing the regression analysis comprises applying a different weight to each of the first data, the second data, and the third data.

38. The method of claim 36, wherein the supplemental content search function is for supplemental content pertaining to what is depicted in the current portion, and wherein the user interface is configured to provide results of the supplemental content search function.

39. The method of claim 36, further comprising:
generating a third plurality of the supplemental content assets; and
ordering, based on first data indicating whether the current portion was recorded by the digital video recorder and second data indicating whether the current portion was output for display from the digital video recorder, the third plurality of the supplemental content assets,
wherein the user interface comprises a third indication of the ordered third plurality of the supplemental content assets, wherein the user interface is configured to, based on a user-selection of the third indication, initiate a process to purchase merchandise associated with at least one of the ordered third plurality of the supplemental content assets.

40. The method of claim 36, wherein the content comprises an event for a sport that is between at least two entities, wherein the first plurality of the supplemental content assets is associated with the at least two entities, and wherein the second plurality of the supplemental content assets is associated with the sport.

41. The method of claim 36, wherein ordering the first plurality of the supplemental content assets is performed based on:

video-on-demand content that was output for display; and
wherein ordering the second plurality of the supplemental content assets is performed based on:
the video-on-demand content that was output for display.

\* \* \* \* \*

UNITED STATES PATENT AND TRADEMARK OFFICE
CERTIFICATE OF CORRECTION

PATENT NO. : 11,832,024 B2
APPLICATION NO. : 12/274452
DATED : November 28, 2023
INVENTOR(S) : Hays et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1562 days.

Signed and Sealed this
First Day of July, 2025

Coke Morgan Stewart
*Acting Director of the United States Patent and Trademark Office*